US012689945B2

(12) United States Patent
Khalid et al.

(10) Patent No.: US 12,689,945 B2
(45) Date of Patent: Jul. 21, 2026

(54) NETWORK RESOURCE RECOMMENDATION USING A MACHINE LEARNING MODEL

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 449 days.

(21) Appl. No.: 17/947,925

(22) Filed: Sep. 19, 2022

(65) Prior Publication Data

US 2024/0098576 A1 Mar. 21, 2024

(51) Int. Cl.
H04W 24/02 (2009.01)
H04W 28/18 (2009.01)
H04W 28/24 (2009.01)

(52) U.S. Cl.
CPC ........... H04W 28/18 (2013.01); H04W 28/24 (2013.01); H04W 24/02 (2013.01)

(58) Field of Classification Search
CPC ..... H04W 28/18; H04W 28/24; H04W 24/02; G06N 20/00; H04L 41/0213; H04L 41/0895; H04L 41/145; H04L 41/16; H04L 41/40; H04L 43/0876; H04L 43/20; H04L 43/50
See application file for complete search history.

(56) References Cited

U.S. PATENT DOCUMENTS

| | | | |
|---|---|---|---|
| 11,070,432 B2 | 7/2021 | Yeung et al. | |
| 2013/0091257 A1* | 4/2013 | Venugopal | ......... H04L 41/0826 |
| | | | 709/221 |
| 2014/0047341 A1 | 2/2014 | Breternitz et al. | |
| 2017/0237655 A1 | 8/2017 | Yang | |
| 2018/0121222 A1 | 5/2018 | Sharma et al. | |
| 2018/0139129 A1* | 5/2018 | Dowlatkhah | ......... H04L 45/306 |

(Continued)

FOREIGN PATENT DOCUMENTS

WO 2021113110 A1 6/2021

OTHER PUBLICATIONS

Notice of Allowance and Notice of Allowability for U.S. Appl. No. 17/743,581, mailed Nov. 17, 2023, 18 pages.

(Continued)

*Primary Examiner* — Robert C Scheibel
*Assistant Examiner* — Sang C Lee
(74) *Attorney, Agent, or Firm* — Dority & Manning, P.A.

(57) ABSTRACT

Resource utilization information including one or more of central processor utilization, memory utilization, and device load values are received from each of a plurality of network devices that compose an access network that is communicatively coupled to a core network. The resource utilization information is provided to a machine learning model to receive an output, wherein the machine learning model has been trained with historical resource utilization information associated with network devices that compose an access network, predetermined thresholds, and an impact to the access network of network resources being added to a core network. A recommended increase in network resources of the core network or the access network is sent to a destination based on the output.

20 Claims, 9 Drawing Sheets

(56) References Cited

U.S. PATENT DOCUMENTS

| | | | |
|---|---|---|---|
| 2018/0375932 A1 | 12/2018 | Gopinth et al. | |
| 2019/0036789 A1* | 1/2019 | Kaplunov | G06Q 10/06393 |
| 2019/0089780 A1 | 3/2019 | Yousaf et al. | |
| 2019/0104047 A1 | 4/2019 | Tejaprakash et al. | |
| 2019/0199760 A1 | 6/2019 | Arauz-Rosado | |
| 2020/0267072 A1 | 8/2020 | Prasad et al. | |
| 2020/0412596 A1 | 12/2020 | Cherunni | |
| 2021/0021444 A1 | 1/2021 | Barabash | |
| 2021/0111979 A1* | 4/2021 | Reid | H04L 9/0643 |
| 2022/0124547 A1* | 4/2022 | Young | H04W 28/0247 |
| 2023/0291661 A1* | 9/2023 | Butler | H04L 41/0895 |

OTHER PUBLICATIONS

Non-Final Office Action for U.S. Appl. No. 17/743,581, mailed Sep. 22, 2022, 21 pages.
Non-Final Office Action for U.S. Appl. No. 17/743,581, mailed Apr. 26, 2023, 24 pages.

\* cited by examiner

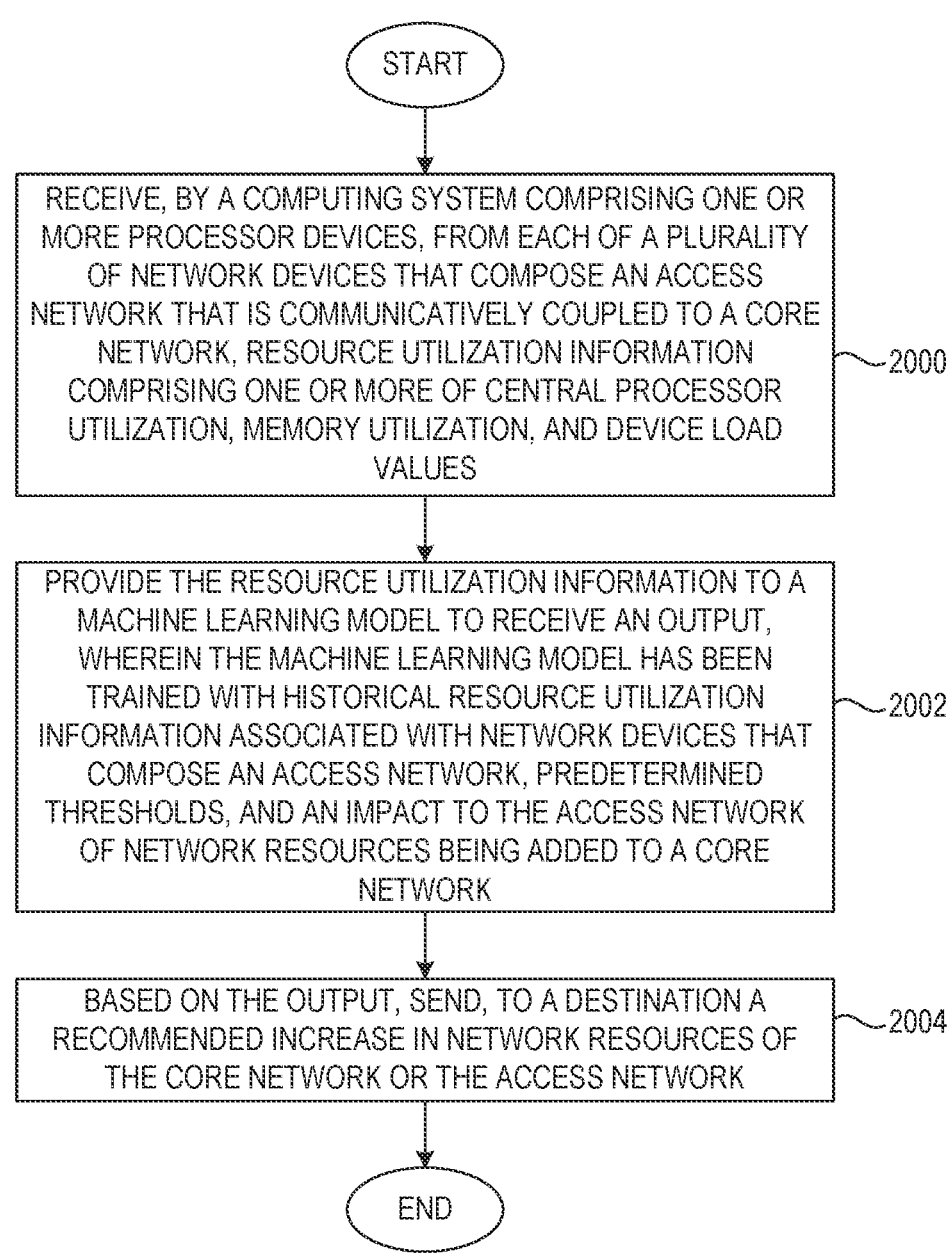

START

RECEIVE, BY A COMPUTING SYSTEM COMPRISING ONE OR MORE PROCESSOR DEVICES, FROM EACH OF A PLURALITY OF NETWORK DEVICES THAT COMPOSE AN ACCESS NETWORK THAT IS COMMUNICATIVELY COUPLED TO A CORE NETWORK, RESOURCE UTILIZATION INFORMATION COMPRISING ONE OR MORE OF CENTRAL PROCESSOR UTILIZATION, MEMORY UTILIZATION, AND DEVICE LOAD VALUES ~2000

PROVIDE THE RESOURCE UTILIZATION INFORMATION TO A MACHINE LEARNING MODEL TO RECEIVE AN OUTPUT, WHEREIN THE MACHINE LEARNING MODEL HAS BEEN TRAINED WITH HISTORICAL RESOURCE UTILIZATION INFORMATION ASSOCIATED WITH NETWORK DEVICES THAT COMPOSE AN ACCESS NETWORK, PREDETERMINED THRESHOLDS, AND AN IMPACT TO THE ACCESS NETWORK OF NETWORK RESOURCES BEING ADDED TO A CORE NETWORK ~2002

BASED ON THE OUTPUT, SEND, TO A DESTINATION A RECOMMENDED INCREASE IN NETWORK RESOURCES OF THE CORE NETWORK OR THE ACCESS NETWORK ~2004

END

FIG. 7

NETWORK RESOURCE RECOMMENDATION USING A MACHINE LEARNING MODEL

BACKGROUND

Large-scale networks, such as 4g and 5g wireless networks, often have a core network and a plurality of access networks. As utilization of an access network increases over time, network resources in the access network and/or the core network may need to be increased to ensure satisfactory performance.

SUMMARY

The disclosed embodiments receive resource utilization information from a plurality of network devise that compose an access network that is communicatively coupled to a core network. The resource utilization information is provided to a machine learning model to receive an output, wherein the machine learning model has been trained with historical resource utilization information associated with network devices that compose an access network, predetermined thresholds, and an impact to the access network of network resources being added to a core network. Based on the output, a recommended increase in network resources is sent to a destination.

In one example a method is provided. The method includes receiving, by a computing system comprising one or more processor devices, from each of a plurality of network devices that compose an access network that is communicatively coupled to a core network, resource utilization information comprising one or more of central processor utilization, memory utilization, and device load values. The method further includes providing the resource utilization information to a machine learning model to receive an output, wherein the machine learning model has been trained with historical resource utilization information associated with network devices that compose an access network, predetermined thresholds, and an impact to the access network of network resources being added to a core network. The method further includes, based on the output, sending, to a destination a recommended increase in network resources of the core network or the access network.

In another example a computing system is provided. The computing system includes one or more processor devices of one or more computing devices. The one or more processor devices are configured to receive, from each of a plurality of network devices that compose an access network that is communicatively coupled to a core network, resource utilization information comprising one or more of central processor utilization, memory utilization, and device load values. The one or more processor devices are further configured to provide the resource utilization information to a machine learning model to receive an output, wherein the machine learning model has been trained with historical resource utilization information associated with network devices that compose an access network, predetermined thresholds, and an impact to the access network of network resources being added to a core network. The one or more processor devices are further configured to, based on the output, send, to a destination a recommended increase in network resources of the core network or the access network.

In another example a non-transitory computer-readable storage medium is provided. The non-transitory computer-readable storage medium includes executable instructions configured to cause one or more processor devices to receive, from each of a plurality of network devices that compose an access network that is communicatively coupled to a core network, resource utilization information comprising one or more of central processor utilization, memory utilization, and device load values. The instructions are further configured to cause the one or more processor devices to provide the resource utilization information to a machine learning model to receive an output, wherein the machine learning model has been trained with historical resource utilization information associated with network devices that compose an access network, predetermined thresholds, and an impact to the access network of network resources being added to a core network. The instructions are further configured to cause the one or more processor devices to, based on the output, send, to a destination a recommended increase in network resources of the core network or the access network.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 7 is a flowchart of a method for network resource recommendation using a machine learning model according to one embodiment;

DETAILED DESCRIPTION

Figure 1:
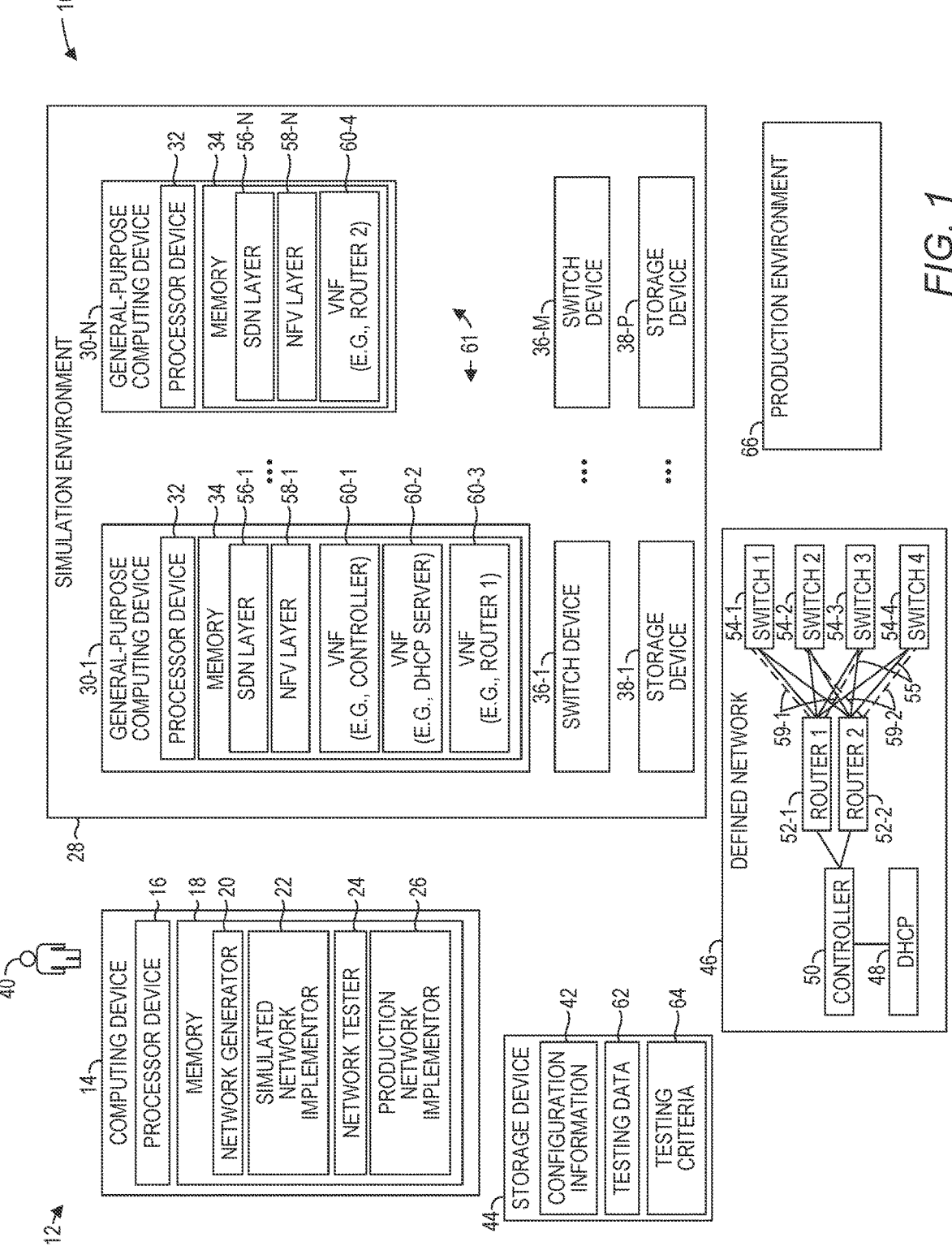
FIG. 1 is block diagram of an environment in which embodiments may be practiced.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Large-scale networks, such as 4g and 5g wireless networks, include a core network and a plurality of access networks via which user/subscribers obtain services. As utilization of an access network increases over time, network resources in the access network and/or the core network may need to be increased to ensure satisfactory performance. Often, it is only determined that an access or core network needs additional resources when network performance had deteriorated to a point that there is user dissatisfaction. It would be desirable to increase network resources prior to the point in time that the network performance has degraded to such a point. However, increasing network resources well before they are required can be costly. Moreover, additional network devices to a production network can cause unexpected consequences at times, and thus typically such proposed changes are first modeled and tested in a test environment. This process is time-consuming and requires costly, specially skilled engineers who are a finite resource. Accordingly, it is desirable that network resources be increased at appropriate times, typically before performance degradation becomes noticeable to users, but not introduced when additional network resources are not needed. Moreover, it is desirable that such additional network resources be well tested prior to introduction in a production environment.

The disclosed embodiments receive resource utilization information from a plurality of network devise that compose an access network that is communicatively coupled to a core network. The resource utilization information may include, by way of non-limiting example, central processor utilization, memory utilization, and/or device load values. The resource utilization information is provided to a machine learning model to receive an output, wherein the machine learning model has been trained with historical resource utilization information associated with network devices that compose an access network, predetermined thresholds, and an impact to the access network of network resources being added to a core network. Based on an output, a recommended increase in network resources is sent to a destination.

Based on the recommended increase in network resources, a computing system may cause a plurality of virtual network function (VNF) instances to be generated on a plurality of general-purpose computing devices to implement the core network or the access network with the recommended network resources, each VNF instance corresponding to one of the plurality of network devices in the core network or the access network. The computing system, based on configuration information, may configure at least some of the VNF instances of the plurality of VNF instances. The computing system may obtain testing data and testing criteria, submit the testing data to the network, and output network test results based on the testing data and the testing criteria.

FIG. 1 is block diagram of an environment 10 in which embodiments may be practiced. The environment 10 includes a computing system 12 that comprises one or more computing devices 14. Each of the computing devices 14 include one or more processor devices 16 and a memory 18. The memory 18 may include one or more components, including, by way of non-limiting example, a network generator 20, a simulated network implementor 22, a network tester 24, and a production network implementor 26.

The environment 10 also includes a simulation environment 28, which includes a plurality of general-purpose computing devices 30-1-30-N (generally, computing device 30). The term "general-purpose" in this context refers to computing devices that are capable of implementing a desired functionality based on executable code files, rather than specialized computing devices that are manufactured to implement a specific functionality. Each of the computing devices 30 include one or more processor devices 32 and a memory 34.

The simulation environment 28 also includes one or more physical switch devices 36-1-36-M (generally, switch devices 36) that provide layer two switching functionality. The simulation environment 28 includes one or more storage devices 38-1-38-P (generally, storage devices 38). The computing system 12 is communicatively coupled to the simulation environment 28. Each computing device 30 may have physical connections to one or more of the switch devices 36 and may also be directly or indirectly communicatively coupled to the storage devices 38.

A user 40 may interact with the network generator 20 to define a desired network that has a specific plurality of components. The network generator 20 may store the defined network in configuration information 42 on a storage device 44. The configuration information 42, in this example, defines a network 46 designed by the user 40. The configuration information 42 identifies a plurality of components that make up the network 46, including, in this example, a dynamic host configuration protocol (DHCP) server 48, a controller 50, routers 52-1 and 52-2 and four switches 54-1-54-4. The configuration information 42 identifies connections between the routers 52-1 and 52-2 and each of the four switches 54-1-54-4, as indicated by solid lines 55. In some implementations, the configuration information 42 may include, by way of non-limiting example, information regarding the means for bringing a network element online, and various settings of the network element. The configuration information 42 identifies a first virtual local area network (VLAN) 59-1 between the switches 54-1 and 54-3, as indicated by dashed lines. The configuration information 42 identifies a second virtual local area network (VLAN) 59-2 between the switches 54-2 and 54-4, as indicated by dashed lines.

The simulated network implementor 22 implements the network 46 identified by the configuration information 42 on the computing devices 30. In some embodiments, the computing devices 30-1-30-N each include corresponding software defined network (SDN) layers 56-1-56-N and corresponding network function virtualization (NFV) layers 58-1-58-N. The SDN layer 56 includes technology that uses software-based controllers and/or application programming interfaces (APIs) to communicate with underlying hardware infrastructure and direct traffic on a network. SDN is an architecture that abstracts the control plane from the data forwarding function. The network function virtualization layer 58 facilitates the virtualization of network services, such as routers, firewalls, load balancers, and the like, that are conventionally implemented in specialized hardware devices.

The embodiments herein utilize SDN and NFV, via the SDN layer 56 and the NFV layer 58, to implement a network 61 that corresponds to the network 46 identified by the configuration information 42 in the simulation environment 28.

In particular, the simulated network implementor 22 receives the configuration information 42 that defines the plurality of components that define the network 46, and causes a plurality of virtual network function (VNF) instances 60-1-60-4 to be generated on the computing devices 30-1-30-N. The VNF instances 60-1-60-4 correspond to components defined by the configuration information 42. In particular, the simulated network implementor 22 causes the generation of a controller VNF instance 60-1 to be generated on the computing device 30-1. The controller VNF instance 60-1 corresponds to the controller 50 of the defined network 46. The simulated network implementor 22 causes the generation of a DHCP server VNF instance 60-2 to be generated on the computing device 30-1. The DHCP server VNF instance 60-2 corresponds to the DHCP server 48 of the defined network 46. The simulated network implementor 22 causes the generation of a router VNF instance 60-3 to be generated on the computing device 30-1. The router VNF instance 60-3 corresponds to the router 52-1 of the defined network 46. The simulated network implementor 22 causes the generation of a router VNF instance 60-4 to be generated on the computing device 30-N. The router VNF instance 60-4 corresponds to the router 52-2 of the defined network 46.

The simulated network implementor 22 also, based on the configuration information 42, configures the VNF instances 60 as appropriate. The configuration may occur at the time of generation of the respective VNF instance 60 or may comprise additional commands submitted subsequent to the generation of the respective VNF instance 60. For example, the simulated network implementor 22 may provide commands similar to those illustrated below in Table 1 to generate and configure the router VNF instance 60-3 on the computing device 30-1 to utilize an inbound interface on one of the switch devices 36 and utilize an outbound interface on four of the switch devices 36. The four switch devices 36 correspond to the switches 54-1-54-4 in the network 46.

TABLE 1

| OpenFlow Protocol |
| --- |
| #Define router |
| {CPU==2.2 GHZ |
| Line speed == 2 Gbps |
| Interface S0/1 inbound |
| Interface S1/1 outbound |
| Interface S1/2 outbound |
| Interface S1/3 outbound |
| Interface S1/4 outbound} |

As another example, the simulated network implementor 22 may submit commands similar to those illustrated below in Table 2 to the router VNF instance 60-3 to generate and configure a VLAN that corresponds to the VLAN 59-1. In some embodiments, the simulated network implementor 22 may utilize the NETCONF protocol to implement the VLAN.

TABLE 2

| #create vlan for users between switch 1 and 3 |
| --- |
| Def Func_vlan( ) |
| Switch 1# config terminal |
| interface x0/x |
| switchport mode access |
| switchport mode access vlan y |

After the network 46 is implemented in the simulation environment 28, the network tester 24 may obtain testing data 62 and testing criteria 64, and submit the testing data 62 to the network 61. The network tester 24 receives results from the testing data 62 and, based on the testing criteria 64 and the results, outputs network test results that can be used to determine whether the network 61 operates as expected and is ready to be implemented in a production environment 66, or requires additional configuration to improve performance prior to implementation in the production environment 66. The testing may comprise any suitable network tests, including, by way of non-limiting example, ping tests to verify connectivity, throughput tests, link capacity tests, and the like. The testing may also include application-level testing, such as, by way of non-limiting example, voice testing, security testing, and the like.

If the network test results indicate that the network 61 is ready to be implemented in the production environment 66, the production network implementor 26 causes the network 61 to be implemented in the production environment 66.

It is noted that, solely for purposes of illustration and ease of explanation, the network generator 20, the simulated network implementor 22, the network tester 24 and the production network implementor 26 are illustrated as separate components, but it will be appreciated that the functionality described herein could be implemented in a single component, or a number of components greater than four. Moreover, because the network generator 20, the simulated network implementor 22, the network tester 24 and the production network implementor 26 are components of the computing system 12, the functionality implemented by such components may be attributed to the computing system 12 generally. In examples where the network generator 20, the simulated network implementor 22, the network tester 24 and the production network implementor 26 comprise software instructions that program the processor devices 16 to carry out functionality discussed herein, functionality implemented by such components may be attributed herein to the processor devices 16. Finally, while for purposes of illustration and ease of explanation the network generator 20, the simulated network implementor 22, the network tester 24 and the production network implementor 26 are illustrated as being implemented on a single computing device 14 of the computing system 12, in other embodiments the components may be implemented on different computing devices 14 of the computing system 12.

Figure 2:
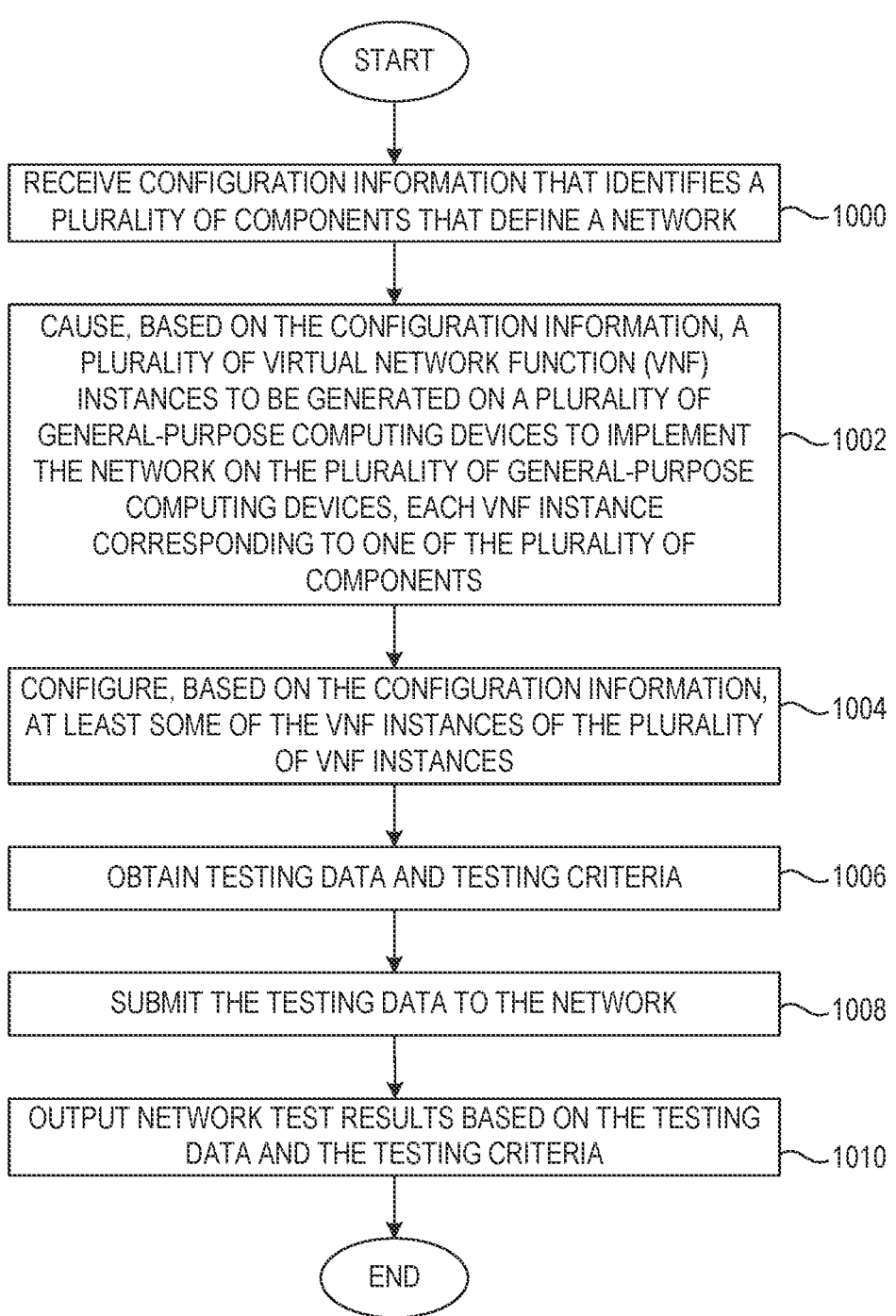
FIG. 2 is a flowchart of a method for automated network generation, validation and implementation in a production environment according to one embodiment.

FIG. 2 is a flowchart of a method for automated network generation, validation and implementation in a production environment according to one embodiment. FIG. 2 will be discussed in conjunction with FIG. 1. The computing system 12 receives the configuration information 42 that identifies the plurality of components that define the network 46 (FIG. 2, block 1000).

The computing system 12 causes, based on the configuration information 42, the plurality of virtual network function (VNF) instances 60 to be generated on the plurality of general-purpose computing devices 30 to implement the network 61 on the plurality of general-purpose computing devices 30, each VNF instance 60 corresponding to one of the plurality of components of the network 46 (FIG. 2, block 1002). The computing system 12 configures, based on the configuration information 42, at least some of the VNF instances 60 of the plurality of VNF instances 60 (FIG. 2, block 1004). The computing system 12 obtains the testing data 62 and the testing criteria 64 (FIG. 2, block 1006). The computing system 12 submits the testing data 62 to the network 61 (FIG. 2, block 1008). The computing system 12 outputs network test results based on the testing data 62 and the testing criteria 64 (FIG. 2, block 1010).

Figure 3:
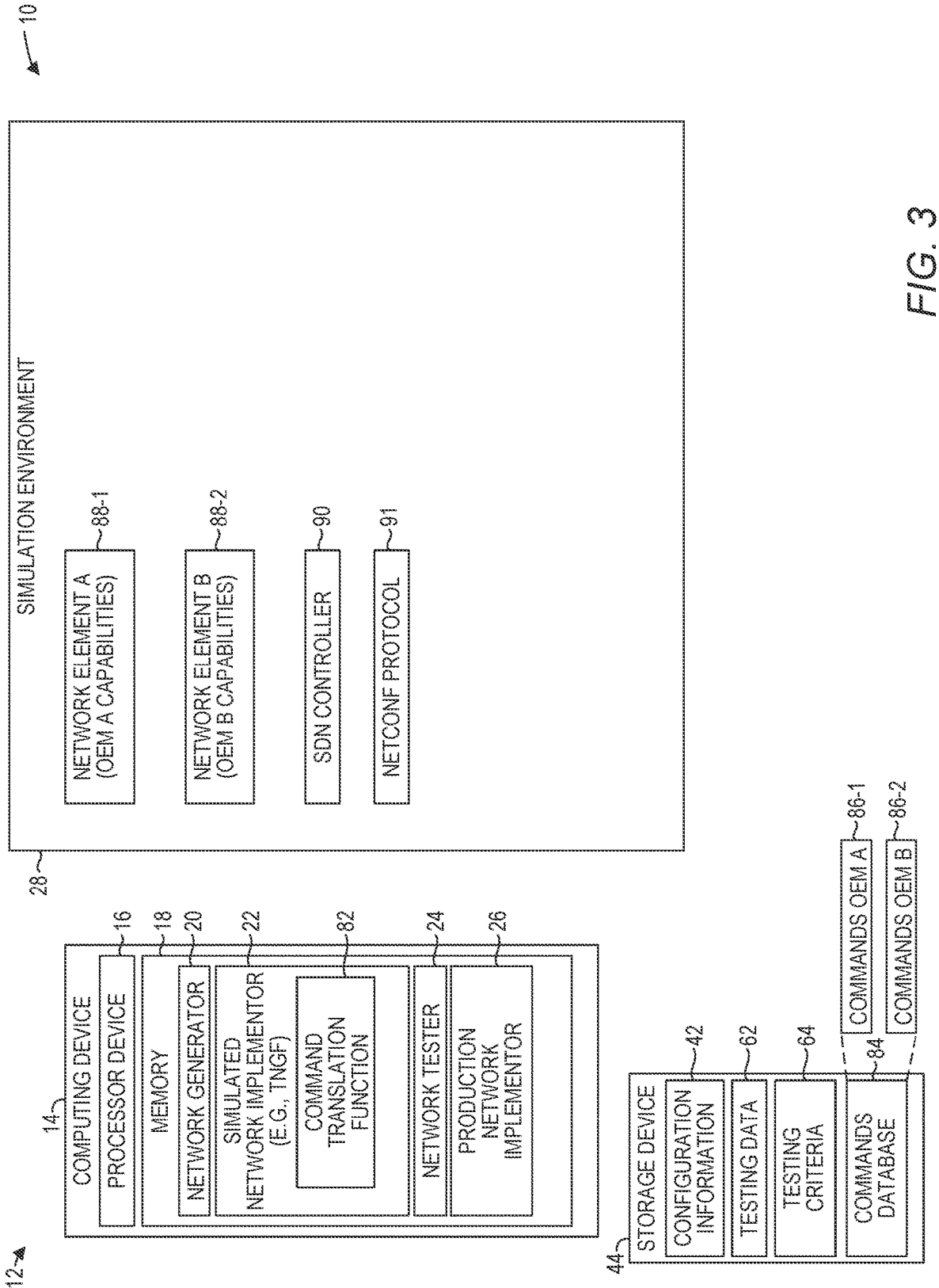
FIG. 3 is a block diagram illustrating a command translation function (CTF) that may be used to facilitate the generation of a simulated network according to one implementation.

FIG. 3 is a block diagram of the environment 10 illustrating a command translation function (CTF) 82 that may be used to facilitate the generation of a simulated network according to one implementation. In this example, the CTF 82 is illustrated as being part of the simulated network implementor 22, but in other implementations the CTF 82 may be separate from the simulated network implementor 22 and the simulated network implementor 22 may utilize the CTF 82 at an appropriate time when configuring the simulation environment 28.

In this example, requirements of the simulation environment 28, such as VLAN requirements, link speed requirements, latency requirements, and the like may be provided to the CTF 82. The CTF 82 accesses a commands database 84 to identify the appropriate commands for a given "flow". The commands database 84 may comprise a plurality of different sets 86-1, 86-2 of commands for each different manufacturer of a network component 88-1, 88-2 that is being simulated. Such sets 86-1, 86-2 of commands may be updated by information obtained from the respective manufacturers as the manufacturers implement new components and/or functionality.

When a new component manufacturer is added, the CTF 82 need not be reprogrammed as the CTF 82 interfaces with the commands database 84 via a standard protocol, and accesses the appropriate set 86-1, 86-2 of commands based on the particular manufacturer of the network component being simulated. The CTF 82 may utilize the Simple Network Management Protocol (SNMP) protocol to configure the network components 88-1, 88-2 via an SDN controller 90.

As another example, the CTF 82 may utilize a programming language, such as Python, to call a function that corresponds to a desired function to be implemented and send the result to the SDN controller 90 utilizing a NETCONF protocol 91 for configuration of the network components 88-1, 88-2.

Figure 4:
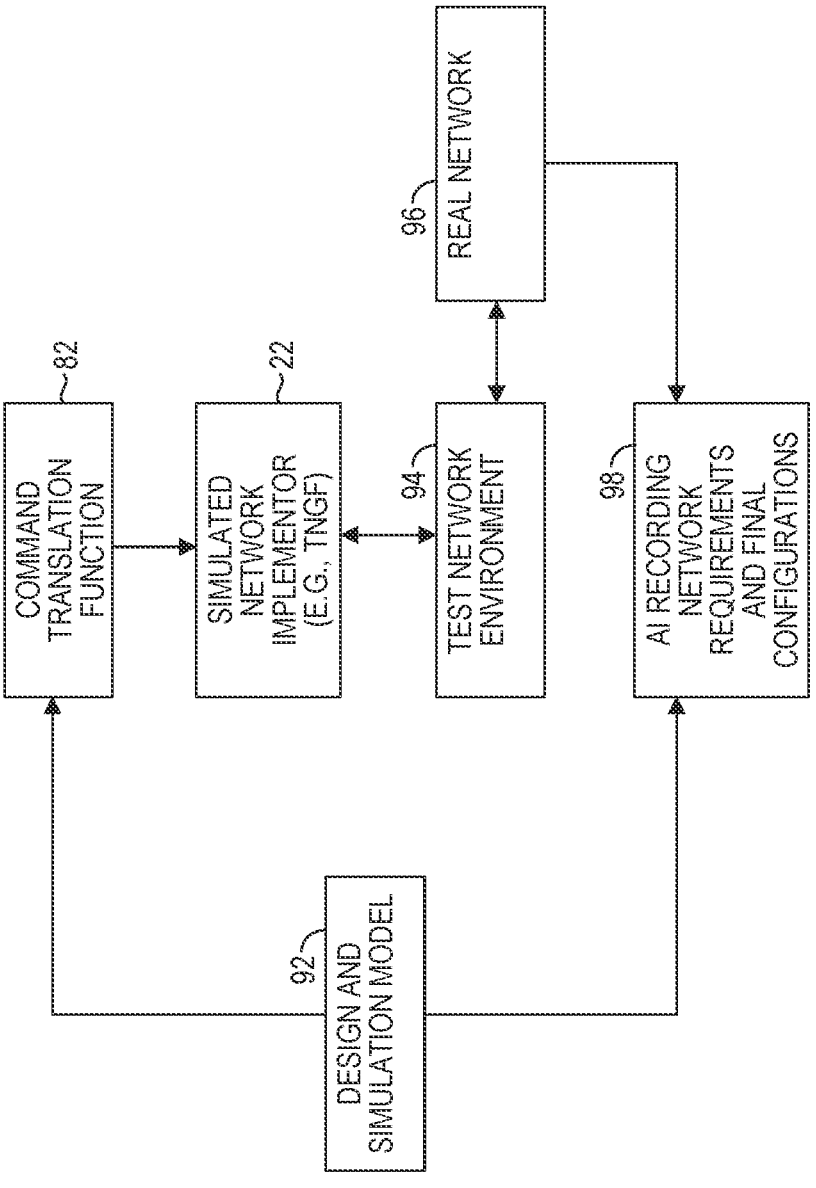
FIG. 4 is a block diagram illustrating the generation of a simulation environment according to another implementation.

FIG. 4 is a block diagram illustrating the generation of a simulation environment according to another implementation. In this example, the network generator 20 generates a simulation model 92. The simulated network implementor 22 (sometimes referred to herein as a test network generation function (TNGF)), interacts with the CTF 82, which in turn interacts with the simulation model 92 to generate a test network environment, such as the simulation environment 28. The test network environment may comprise a plurality of resources for emulating a test network, such as SDN servers that can be configured to be a switch, a router, an attenuator, end user emulators, or the like. A programming language with a library-like structure may be used to set this up.

Applications may be used to generate different tests to test the test network environment (block 94). If the tests are satisfactory, a real network 96 may be setup either automatically or semi-automatically. An artificial intelligence function 98 may record the configuration for future deployments as well as existing networks.

Figure 5:
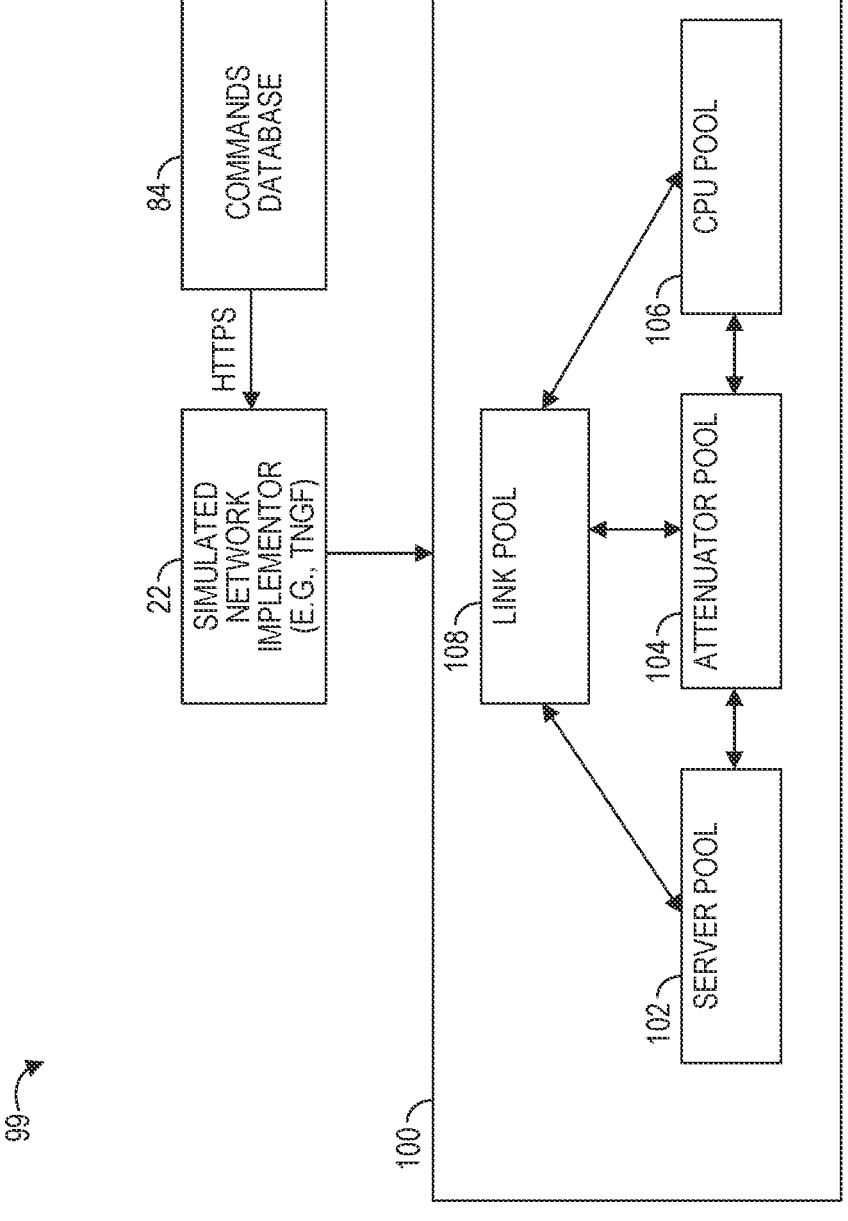
FIG. 5 is a block diagram of an environment illustrating mechanisms for generating a simulation environment according to another implementation.

FIG. 5 is a block diagram of an environment 99 illustrating mechanisms for generating a simulation environment 100 according to another implementation. The environment 99 includes the simulated network implementor 22 and the commands database 84. A simulation environment 100 includes a plurality of pools of resources, such as, by way of non-limiting example, a server pool 102 of servers, an attenuator pool 104 of attenuators, a processor device pool 106 of processor devices, and a link pool 108 of links.

Network demand in areas is not uniform. For example New York City may have higher demand compared to San Diego, and within New York City some areas, such as the Manhattan parks and financial district may require densification sooner than other parts of the city. In a network the load on a given network can be obtained via SNMP (simple network management protocol). The following, by way of non-limiting example, is useful information in assessment: CPU usage of devices, memory usage, load on the devices, number of users, demand of users, and peak usage. As the load on the network devices increase, the network core must support the increased demand it to ensure there is no bottleneck in the network. The SNMP protocol may collect this information and this may be put in a format acceptable for a database. Artificial intelligence/machine learning may record this information for learning purposes. Given increases in network demand, such as wireless data usage, overall traffic demand, traffic surges due to events such as games or concerts, the embodiments may configure additional resources.

The embodiments may test a new configuration in a simulation environment, as discussed above, and learn from simulation environment as discussed before new configuration is implemented on the production setup. This will ensure that the new settings work and will work seamlessly in the production environment. Increase in demand may be addressed by adding new sectors, frequencies (bandwidth), new cells, and or addition network devices. Addition of new network devices in an access network will bring additional demand for the core network which may need to be enhanced as well.

Figure 6:
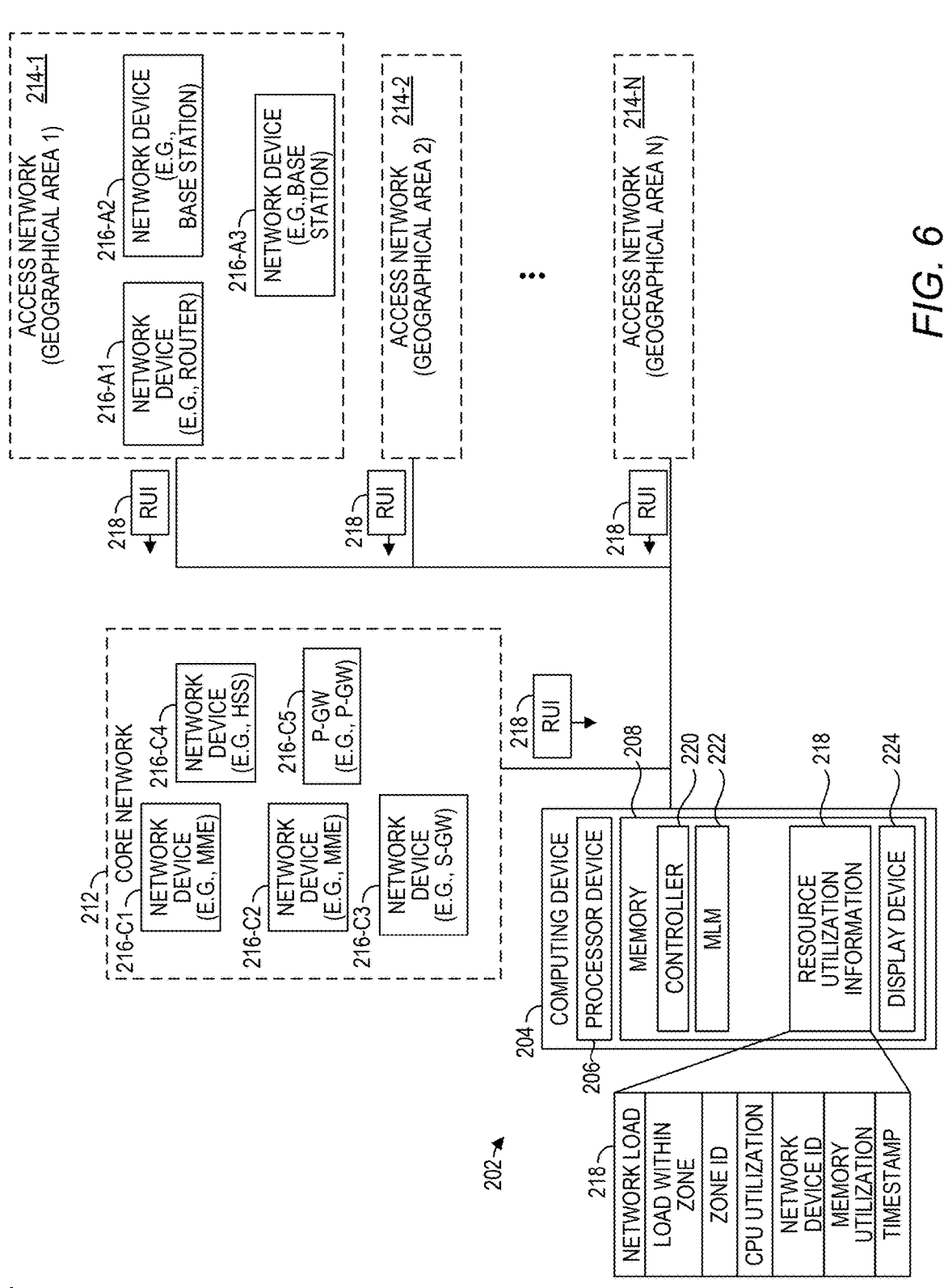
FIG. 6 is a block diagram of an environment suitable for network resource recommendation using a machine learning model according to one implementation.

FIG. 6 is a block diagram of an environment 200 suitable for network resource recommendation using a machine learning model according to one implementation. The environment 200 includes a computing system 202 that includes one or more computing devices 204, each of which may include a processor device 206 and a memory 208. The environment 200 includes a network 210 that includes a core network 212 and a plurality of access networks 214-1-214-N. In this embodiment the network 210 comprises a wireless network, such as a 4G or 5G wireless network, but the embodiments are not limited to any particular kind of network, and have applicability to any network having a core network component and one or more access network components, and can include fiber, wired, or any other type of communication medium.

In this example the core network 212 includes a plurality of network devices 216-C1-216-C5, which may comprise for example, one or more mobility management entities (MMEs), home subscriber servers (HSSs), serving gateways (SGWs), PDN gateways (PGWs), or the like. In this example the access network 214-1 includes a plurality of network devices 216-A1-216-A3, which may comprise, for example, routers, switches, base stations, or the like. The access networks 214-2-214-N may be configured similarly to the access network 214-1. Each of the access networks 214 may service a different zone, such as a different geographic location. The increase in usage of an access network 214 over time may differ greatly depending on the particular geographic location. Generally, the network devices 216-C1-216-C5 and 216-A1-216-A3 may be referred to generally as network devices 216.

The network devices 216 periodically, intermittently, or upon request, send resource utilization information (RUI) 218 to a controller 220. In some embodiments, the resource utilization information 218 may be communicated using a simple network management protocol (SNMP). In some embodiments, the controller 220 may periodically poll the network devices 216 for the RUI 218. The RUI 218 may comprise, by way of non-limiting example, real-time memory utilization values, central processor utilization values, device load values, network segment utilization values, network load values, a network device identifier of the network device 216 providing the RUI 218, a zone identifier of the particular access network 214 in which the network device 216 is located, a number of users currently connected to a particular network device 216, and/or connections to the network device 216, and the like.

The controller 220 may provide the RUI 218 associated with an access network 214, such as the access network 214-1, to a machine learning model (MLM) 222 that, as will be discussed in greater detail herein, has been trained with historical RUI associated with network devices 216 of the access network 214-1, predetermined thresholds, and how network resources of network devices in the access network 214-1 or the core network 212 may be desirable in view of the RUI 218. Based on the information received from the MLM 222, the controller 220 may send to a destination, such as a display device 224, a recommendation for an increase in network resources of the core network 212 and/or the access network 214-1. Such recommendations may include, by way of non-limiting example, an additional identified amount of a particular computer resource, such as memory, to an existing network device 216. Such recommendations may also include, for example, a recommendation for an additional one or more network devices, such as one or more of an MME, a serving gateway, a home subscriber server and a packet data network gateway.

In some embodiments, the computing device 204 may be part of the computing system 12 illustrated in FIG. 1, and, based on the recommended increase in network resources, cause a plurality of virtual network function (VNF) instances 60 to be generated on a plurality of general-purpose computing devices 30 to implement the core network 212 or the access network 214-1 with the recommended network resources on the plurality of general-purpose computing devices 30, each VNF instance 60 corresponding to one of the plurality of network devices 216 in the core network 212 or the access network 214. The computing device 204 may, based on configuration information obtained from the MLM 222 or stored elsewhere, configure at least some of the VNF instances 60. The computing device 204 may obtain testing data and testing criteria and submit the testing data to the network, and output network test results based on the testing data and the testing criteria.

FIG. 7 is a flowchart of a method for network resource recommendation using a machine learning model according to one embodiment. FIG. 7 will be discussed in conjunction with FIG. 6. The computing system 202 receives, from each of the plurality of network devices 216-A1-216-A3 that compose the access network 214-1 that is communicatively coupled to the core network 212, the resource utilization information 218 comprising one or more of central processor utilization, memory utilization, and device load values (block 2000). The computing system 202 provides the resource utilization information 218 to the machine learning model 222 to receive an output, wherein the machine learning model 222 has been trained with historical resource utilization information associated with network devices that compose an access network, predetermined thresholds, and an impact to the access network of network resources being added to a core network (block 2002).

Based on the output, the computing system 202 sends to a destination, such as the display device 224, a recommended increase in network resources of the core network 212 or the access network 214-1 (block 2004).

Figure 8:
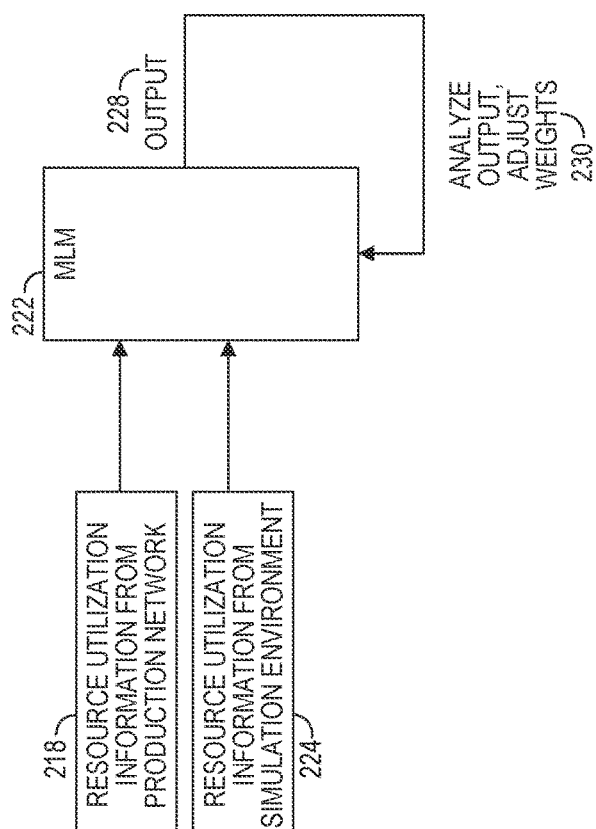
FIG. 8 is a block diagram of a method for training a machine learning model suitable for implementing network resource recommendations according to one embodiment.

FIG. 8 is a block diagram of a method for training the machine learning model suitable for implementing network resource recommendations according to one embodiment. The resource utilization information 218 from a production environment may be provided to the MLM 222. Resource utilization information 226 generated from a simulation environment may also be provided to the MLM 222. In response, the MLM 222 outputs 228 a recommendation for additional network resources for a core network. The output 228 may be analyzed 230, and the parameters of the MLM 222 may be adjusted. This process may be repeated until the MLM 222 provides outputs 228 that are tested and established to be valid outputs 228.

In some embodiments the MLM 222 is trained based on configuration 20 settings that improve the system performance for a given dynamic change with a positive improvement. For example, the MLM 222 be trained to find an optimum path for voice or a particular type of packet. The MLM 222 may then be validated using new data to see if the algorithm works as expected.

Figure 9:
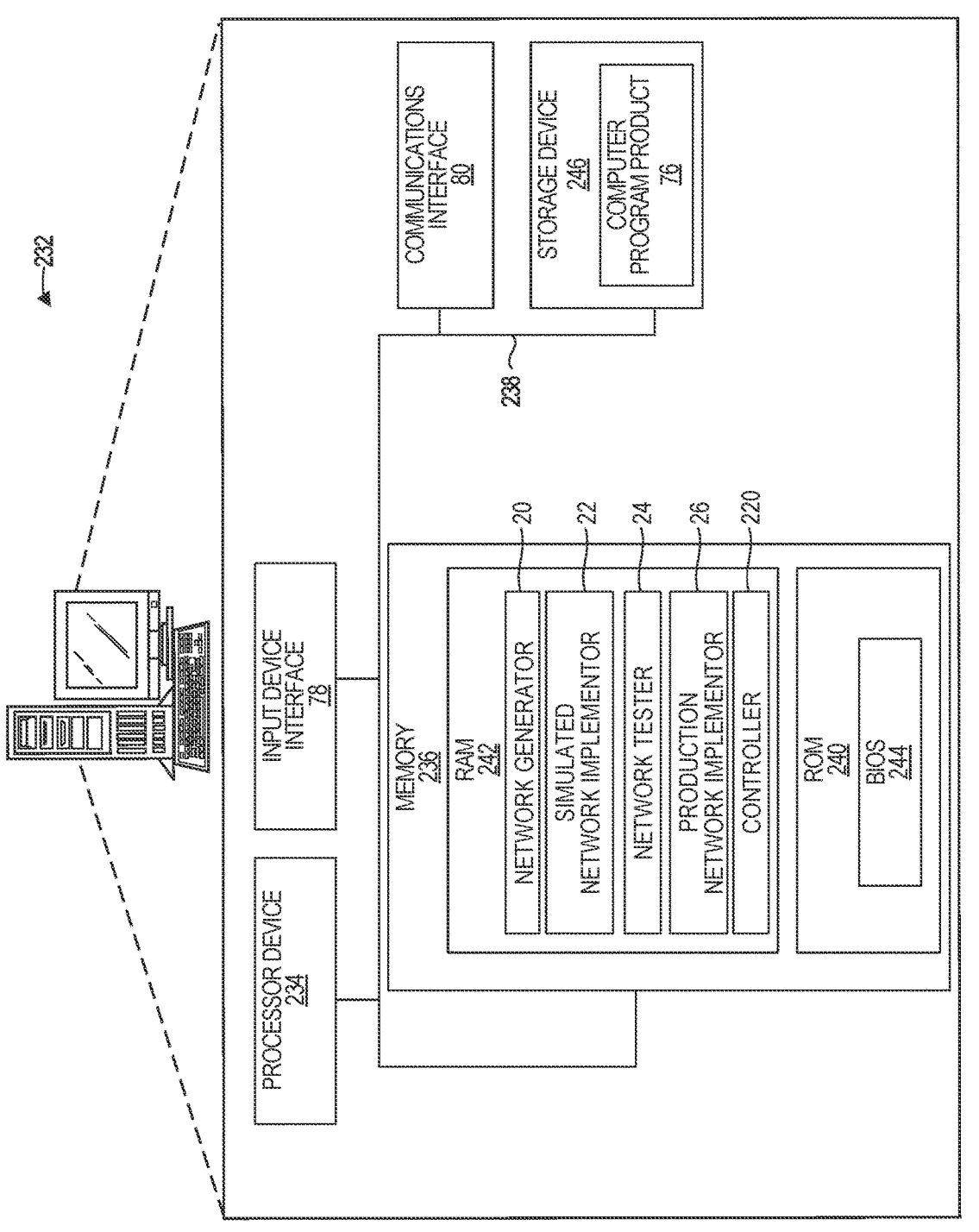
FIG. 9 is a block diagram of a computing device suitable for implementing embodiments disclosed herein.

FIG. 9 is a block diagram of a computing device 232 suitable for implementing the embodiments disclosed herein, including the computing device 14 and the computing device 204. The computing device 232 may comprise any computing or electronic device capable of including firmware, hardware, and/or executing software instructions to implement the functionality described herein, such as a computer server, a desktop computing device, a laptop computing device, or the like. The computing device 232 includes a processor device 234, a memory 236, and a system bus 238. The system bus 238 provides an interface for system components including, but not limited to, the memory 236 and the processor device 234. The processor device 234 can be any commercially available or proprietary processor.

The system bus 238 may be any of several types of bus structures that may further interconnect to a memory bus (with or without a memory controller), a peripheral bus, and/or a local bus using any of a variety of commercially available bus architectures. The memory 236 may include non-volatile memory 240 (e.g., read-only memory (ROM), erasable programmable read-only memory (EPROM), electrically erasable programmable read-only memory (EEPROM), etc.), and volatile memory 242 (e.g., random-access memory (RAM)). A basic input/output system (BIOS) 244 may be stored in the non-volatile memory 240 and can include the basic routines that help to transfer information between elements within the computing device 232. The volatile memory 242 may also include a high-speed RAM, such as static RAM, for caching data.

The computing device 232 may further include or be coupled to a non-transitory computer-readable storage medium such as a storage device 246, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 246 and other drives associated with computer-readable media and computer-usable media may provide non-volatile storage of data, data structures, computer-executable instructions, and the like.

A number of modules can be stored in the storage device 246 and in the volatile memory 242, including an operating system and one or more program modules, such as the network generator 20 and/or the controller 220, the simulated network implementor 22, the network tester 24, the production network implementor 26, and/or the controller 220, which may implement the functionality described herein in whole or in part.

All or a portion of the embodiments may be implemented as a computer program product 76 stored on a transitory or non-transitory computer-usable or computer-readable storage medium, such as the storage device 246, which includes complex programming instructions, such as complex computer-readable program code, to cause the processor device 234 to carry out the steps described herein. Thus, the computer-readable program code can comprise software instructions for implementing the functionality of the examples described herein when executed on the processor device 234.

An operator may also be able to enter one or more configuration commands through a keyboard (not illustrated), a pointing device such as a mouse (not illustrated), or a touch-sensitive surface such as a display device. Such input devices may be connected to the processor device 234 through an input device interface 78 that is coupled to the system bus 238 but can be connected by other interfaces such as a parallel port, an Institute of Electrical and Electronic Engineers (IEEE) 1394 serial port, a Universal Serial Bus (USB) port, an IR interface, and the like. The computing device 232 may also include a communications interface 80 suitable for communicating with other computing devices as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:

receiving, by a computing system comprising one or more processor devices, from each of a plurality of network devices that compose an access network that is communicatively coupled to a core network and facilitates communications between the core network and user devices, resource utilization information comprising one or more of central processor utilization, memory utilization, and device load values;

providing the resource utilization information to a machine learning model to receive an output, wherein the machine learning model has been trained with historical resource utilization information associated with network devices that compose an access network, predetermined thresholds, and an impact to the access network of network resources being added to a core network;

based on the output, sending, to a destination a recommended increase in hardware network resources of the core network or the access network; and based on the recommended increase in network resources, causing, by the computing system, a plurality of virtual network function (VNF) instances to be generated on a plurality of general-purpose computing devices of a simulation environment that is separate from the access network and the core network to implement the core network or the access network with the recommended network resources on the plurality of general-purpose computing devices, each VNF instance corresponding to one of the plurality of network devices in the core network or the access network.

2. The method of claim 1 wherein receiving, from each of the plurality of network devices that compose an access network, resource utilization information further comprises:

iteratively polling, over a period of time, the plurality of network devices via SNMP to obtain the resource utilization information.

3. The method of claim 1 wherein the resource utilization information includes network segment utilization values.

4. The method of claim 1 wherein the device load values comprises one or more of a number of users currently connected to the network device and a peak usage of the network device.

5. The method of claim 1 wherein the additional network resources comprises one or more of an additional mobile management entity (MME), a serving gateway, a home subscriber server and a packet data network gateway.

6. The method of claim 1 wherein the additional network resources comprises an identified amount of additional memory for an existing network device.

7. The method of claim 1 further comprising:

configuring, by the computing system based on configuration information, at least some of the VNF instances of the plurality of VNF instances;

obtaining, by the computing system, testing data and testing criteria;

submitting, by the computing system, the testing data to the network; and outputting network test results based on the testing data and the testing criteria.

8. A computing system comprising:

one or more processor devices of one or more computing devices, the one or more processor devices configured to:

receive, from each of a plurality of network devices that compose an access network that is communicatively coupled to a core network and facilitates communications between the core network and user devices, resource utilization information comprising one or more of central processor utilization, memory utilization, and device load values;

provide the resource utilization information to a machine learning model to receive an output, wherein the machine learning model has been trained with historical resource utilization information associated with network devices that compose an access network, predetermined thresholds, and an impact to the access network of network resources being added to a core network;

based on the output, send, to a destination a recommended increase in hardware network resources of the core network or the access network; and based on the recommended increase in network resources, cause a plurality of virtual network function (VNF) instances to be generated on a plurality of general-purpose computing devices of a simulation environment that is separate from the access network and the core network to implement the core network or the access network with the recommended network resources on the plurality of general-purpose computing devices, each VNF instance corresponding to one of the plurality of network devices in the core network or the access network.

9. The computing system of claim 8 wherein to receive, from each of the plurality of network devices that compose the access network, resource utilization information, the one or more processor devices are further configured to:

iteratively poll, over a period of time, the plurality of network devices via SNMP to obtain the resource utilization information.

10. The computing system of claim 8 wherein the resource utilization information includes network segment utilization values.

11. The computing system of claim 8 wherein the device load values comprises one or more of a number of users currently connected to the network device and a peak usage of the network device.

12. The computing system of claim 8 wherein the additional network resources comprises one or more of an additional mobile management entity (MME), a serving gateway, a home subscriber server and a packet data network gateway.

13. The computing system of claim 8 wherein the additional network resources comprises an identified amount of additional memory for an existing network device.

14. The computing system of claim 8 wherein the one or more processor devices are further configured to:

configure, based on configuration information, at least some of the VNF instances of the plurality of VNF instances;

obtain testing data and testing criteria;

submit the testing data to the network; and output network test results based on the testing data and the testing criteria.

15. A non-transitory computer-readable storage medium that includes executable instructions configured to cause one or more processor devices to:

receive, from each of a plurality of network devices that compose an access network that is communicatively coupled to a core network and facilitates communications between the core network and user devices, resource utilization information comprising one or more of central processor utilization, memory utilization, and device load values;

provide the resource utilization information to a machine learning model to receive an output, wherein the machine learning model has been trained with historical resource utilization information associated with network devices that compose an access network, predetermined thresholds, and an impact to the access network of network resources being added to a core network;

based on the output, send, to a destination a recommended increase in hardware network resources of the core network or the access network; and based on the recommended increase in network resources, cause a plurality of virtual network function (VNF) instances to be generated on a plurality of general-purpose computing devices of a simulation environment that is separate from the access network and the core network to implement the core network or the access network with the recommended network resources on the plurality of general-purpose computing devices, each VNF instance corresponding to one of the plurality of network devices in the core network or the access network.

16. The non-transitory computer-readable storage medium of claim 15 wherein to receive, from each of the plurality of network devices that compose the access network, resource utilization information, the instructions further cause the one or more processor devices to:

iteratively poll, over a period of time, the plurality of network devices via SNMP to obtain the resource utilization information.

17. The non-transitory computer-readable storage medium of claim 15 wherein the resource utilization information includes network segment utilization values.

18. The non-transitory computer-readable storage medium of claim 15 wherein the device load values comprises one or more of a number of users currently connected to the network device and a peak usage of the network device.

19. The non-transitory computer-readable storage medium of claim 15 wherein the additional network resources comprises one or more of an additional mobile management entity (MME), a serving gateway, a home subscriber server and a packet data network gateway.

20. The non-transitory computer-readable storage medium of claim 15 wherein the additional network resources comprises an identified amount of additional memory for an existing network device.

\* \* \* \* \*